(12) United States Patent (10) Patent No.: US 7,022,797 B2
Blackmon et al. (45) Date of Patent: Apr. 4, 2006

(54) POLYMERIZATION PROCESS

(75) Inventors: Kenneth P. Blackmon, Houston, TX (US); Shabbir Ahmedbhai Malbari, Pasadena, TX (US)

(73) Assignee: Fina Technology, Inc., Houston, TX (US)

( * ) Notice: Subject to any disclaimer, the term of this patent is extended or adjusted under 35 U.S.C. 154(b) by 0 days.

(21) Appl. No.: 10/783,331

(22) Filed: Feb. 20, 2004

(65) Prior Publication Data

US 2005/0187360 A1 Aug. 25, 2005

(51) Int. Cl.
*C08F 110/06* (2006.01)

(52) U.S. Cl. ............... 526/351; 526/123.1; 526/124.1; 526/124.2; 526/124.3

(58) Field of Classification Search ........... 526/351, 526/123.1, 124.1, 124.2, 124.3

See application file for complete search history.

(56) References Cited

U.S. PATENT DOCUMENTS 6,657,025 B1 * 12/2003 Blackmon et al. .......... 526/142

* cited by examiner

*Primary Examiner*—Ling-Sui Choi
(74) *Attorney, Agent, or Firm*—William D. Jackson; Tenley R. Krueger

(57) ABSTRACT

A monomer stream containing propylene is supplied to a polymerization reactor which is operated under temperature and pressure conditions effective for the production of a stereoregular propylene polymer fluff. A titanium-based supported Ziegler-Natta catalyst having a titanium content of at least 1.7 wt. % and incorporating an internal electron donor is incorporated into the monomer stream. A trialkylaluminum co-catalyst is supplied to the monomer stream in an amount to provide an aluminum/titanium molar ratio within the range of 50–500. A silicon-based external electron donor is also supplied to the monomer stream in an amount to provide an aluminum/silicon molar ratio within the range of 10–500. Polymer fluff recovered from the polymerization reactor has a melt flow rate of at least 200 grams/10 minutes, and a xylene soluble content of no more than 4 wt. %.

19 Claims, 3 Drawing Sheets

POLYMERIZATION PROCESS

FIELD OF THE INVENTION

This invention relates to the polymerization of propylene over Ziegler-type catalysts and, more particularly, to polymerization processes carried out using supported titanium based catalysts of closely controlled titanium content to produce isotactic polypropylene having high melt flow rates while retaining good stereoregularity.

BACKGROUND OF THE INVENTION

The polymerization of propylene over Ziegler-type catalysts to produce isotactic propylene polymers is well known in the art. The stereoregularity of such isotactic polymers is typically measured in terms of the percent of the polymer fluff which is soluble in xylene. In general, relative low xylene solubles content polymers are preferred.

Ziegler-type catalysts incorporate a transition metal such as titanium, zirconium or hafnium, which functions to provide sites for the insertion of monomer units into growing polymer chains. One type of such polymerization catalysts involves the so-called homogeneous catalyst systems in which the transition metal compound is a metallocene comprising one or more substituted or unsubstituted cyclopentadienyl groups coordinated with the transition metal atom forming the situs for polymer growth. Such metallocene-based catalyst systems are disclosed U.S. Pat. No. 4,794,096 to Ewen and U.S. Pat. No. 4,892,851 to Ewen et al., for use in the polymerization of propylene to form isotactic or syndiotactic polypropylene.

The more widely used transition metal catalysts are the so-called heterogeneous catalyst systems in which transition metal halides, zirconium, hafnium or titanium, di-, tri-, or tetra-halides, are incorporated with a support structure, principally based upon magnesium or zinc halides, ethoxides or the like. For example, U.S. Pat. No. 4,476,289 to Mayr et al. discloses so-called "activated" titanium tetrahalides, more specifically, titanium tetrachloride, supported on anhydrous magnesium or zinc halides, principally magnesium chloride or magnesium bromide. The transition metal component is used in conjunction with a second component, commonly referred to as a co-catalyst, which as described in the Mayr et al. patent, is a hydride or organometallic compound based primarily upon aluminum, although lithium or magnesium based compounds are also disclosed. A supported catalyst containing yet another component is disclosed in U.S. Pat. No. 4,636,486 to Mayr et al. Here, the titanium, compound, which may be a halide, an oxyhalide or an alcoholate in either the di-, tri-, or tetravalent form, is composited with the magnesium support, together with an electron donor compound. Such electron donors, commonly referred to as internal electron donors because they are incorporated as part of the transition metal catalyst component, can be selected from a broad class of compounds including amines, amides, phosphines, ethers, thioethers, alcohol esters, aldehydes, and ketones. As in the case of the aforementioned U.S. Pat. No. 4,476,289 to Mayr, the catalyst system here also includes a co-catalyst such as trimethyaluminum (TMA) or triethylaluminum, (TEAL).

Yet a third component often employed in Ziegler-type catalyst systems is a so-called external electron donor. The external electron donors function similarly as the internal electron donors and in a complimentary or supplementary manner to regulate monomer insertion into the polymer chain growing on the transition metal active sites. Thus, the electron donors can have an impact upon catalyst activity, polymer molecular weight, and polymer morphology as reflected in stereospecificity and physical parameters such as melting point. For example, in the polymerization of propylene, the addition of electron donors under controlled conditions can result in dramatic increases in activity (the amount of polymer produced per unit of catalyst) and in stereoregularity, e.g., an increase in isotactic polymer content with a corresponding decrease in atactic polymer content.

The complimentary nature of the internal and external electron donors is addressed in Soga, K. et al., "Effect of Diesters and Organosilicon Compounds on the Stability and Stereospecificity of Ziegler-Natta Catalysts", Transition Metal Catalyzed Polymerizations: Ziegler-Natta and Metathesis Polymerizations, Quirk, R. P., Ed., Cambridge University Press, New York, 1988, pp. 266–279. As discussed in Soga, the concentrations of the internal and external donors in the catalyst system can be adjusted in order to optimize the activity and the stereospecificity of the catalyst. In the experimental work reported there, the transition metal catalyst component comprising titanium tetrachloride supported on magnesium dichloride with an internal donor, e.g., di-N butylphthalate, was slurried in hexane followed by the addition of an external electron donor, phenyl tri-ethoxysilane, and triethylaluminum (TEA) co-catalyst. Soga et al. report on polymerization rates over periods of several hours and isotactic indices measured over periods of several hours for various internal, external catalyst systems at varying concentrations expressed in terms of silicon/titanium mol ratios and TEA/titanium mol ratios.

U.S. Pat. No. 4,287,328 to Kikuta et al., is directed to the polymerization of alpha olefins in the presence of multicomponent catalyst systems involving a "solid product" combined with an organoaluminum compound including, for example, $C_1$–$C_{10}$ trialkylaluminum, triethylaluminum, alkyl alkyoxyaluminums, and alkylaluminum halides, and an electron donor including various organic acids, alcohols, ethers, aldehydes, ketones, amines, alkenol amines, esters, phosphines, phosphites, thioethers, thioalcohols, silanes, and siloxanes. The "solid product" catalyst component is formed by reacting a trivalent metal halide such as aluminum trichloride, aluminum tribromide or ferric trichloride with a divalent metal compound such as magnesium, calcium, or zinc hydroxide or oxide or carbonate with titanium tetrachloride, characterized as an electron acceptor. Numerous orders of additions of the various component are described in Kikuta et al., especially in columns 6 through 9. Conditions of mixing can vary over wide temperature ranges and time intervals, but temperatures are preferably in the range of room temperature to about 100° C. The mixing of the various components can be carried out over periods of several minutes to several hours.

U.S. Pat. No. 4,567,155 to Tovrog et al., discloses multicomponent catalyst systems useful in the gas phase polymerization of alpha olefins. In Tovrog et al., the catalyst systems comprise two base catalyst components, each containing subcomponents. The first component, identified as component "A" comprises a titanium component supported on a hydrocarbon insoluble magnesium component in combination with an electron compound. The second major component is a co-catalyst component, characterized as component "B" comprising a trialkylaluminum, an aromatic acid ester and an unhindered secondary amine. Tovrog discloses that the catalyst components may be mechanically activated by comminution prior to use in polymerization. Comminuted catalysts may be pre-polymerized with an alpha olefin before use as a polymerization catalyst component. In the pre-polymerization procedure, comminuted catalysts and an organoaluminum compound co-catalyst are contacted with an alpha olefin under polymerization conditions and preferably in the presence of a modifier such as methyt-p-toluate and an inert hydrocarbon such as hexane, with typical time durations for prepolymerization and other pretreatment procedures involving periods of minutes up to a few hours.

U.S. Pat. No. 4,767,735 to Ewen et al. discloses a pre-polymerization process carried out over a period of less than a minute and usually ten seconds or less. In the Ewen et al. procedure, an organic solvent stream such as hexane or heptane is established in a pre-mixing line. To this stream are added sequentially a co-catalyst (TEAL), an external electron donor (diphenyldimethyoxysilane) and a supported catalyst component (titanium tetrachloride supported on magnesium dichloride) to form a catalyst system which is then pre-polymerized by contact with propylene for a few seconds. An alternative mode of addition in the Ewen et al. procedure is to add the electron donor to the carrier stream after the addition of the titanium catalyst component, but still before the addition of the propylene. Ewen et al. disclose that the cocatalyst should be present when the electron donor and the transition metal catalyst component contact one another in order to avoid poisoning of the titanium catalyst.

High efficiency catalyst systems employing external electron donors which may be characterized generally as sec or tert alkyl or cycloalkyl, alkyl dialkoxy silanes in combination with titanium tetrachloride supported on magnesium based supports derived from dialkoxy magnesium compounds are disclosed in U.S. Pat. No. 4,927,797 to Ewen. By way of example, the supported catalyst may be formulated through the reaction of diethoxy magnesium, titanium tetrachloride, and butyl phthalate under appropriate conditions as specified in the patent. A suitable external electron donor here is methylcyclohexyldimethoxysilane which is compared with diphenyldimethoxysilane as disclosed in the aforementioned Ewen et al. patent.

U.S. Pat. No. 5,432,139 to Shamshoum, et al. discloses the formulation of titanium tetrachloride and other transition metal chloride supported catalyst systems by means of various orders of addition of the catalyst components in order to achieve various results in terms of melt flow indices, polymer bulk density catalyst activities and xylene solubles content. As disclosed in the Shamshoum, et al. patent, various factors such as order of addition and the time in which various components are contacted before the addition of another component can be regulated to arrive at a catalyst having desired characteristics in terms of factors such as activities and bulk density and stereoregularity of the polymer product. Another consideration in the polymerization of propylene is the melt flow index of the polymer product.

SUMMARY OF THE INVENTION

In accordance with the present invention there is provided a novel process for the production of a stereoregular propylene polymer characterized in terms of a high melt flow rate while retaining a relatively high stereoregularity as measured by the xylene soluble content of the polymer product. In carrying out the invention, a polymerization reactor is operated under, temperature and pressure conditions effective for the reaction of propylene supplied to the reactor to produce stereoregular isotactic propylene polymer fluff. A monomer stream containing propylene is supplied to the polymerization reactor. A titanium-based supported Ziegler-Natta catalyst, is incorporated into the monomer stream. The titanium-based catalyst incorporates an internal electron donor and has a titanium content of at least 1.7 wt. %. A co-catalyst comprising a trialkylaluminum is supplied to the propylene monomer stream. The co-catalyst is supplied in an amount to provide an aluminum/titanium molar ratio within the range of 50–500. In addition, a silicon-based external electron donor is supplied to the propylene monomer stream in an amount to provide an aluminum/silicon molar ratio within the range of 10–500. Polymer fluff is recovered from the polymerization reactor. The polymer fluff has a melt flow rate of at least 200 grams/10 minutes, preferably at least 300 grams/10 minutes, and a xylene soluble content of no more than 4 wt. % and preferably no more than 3.5 wt. %. Preferably, the Ziegler-Natta catalyst comprises titanium tetrachloride on a magnesium based support, and the internal electron donor is di-butylphthalate. A preferred external electron donor is cyclohexomethyldimethoxysilane. A preferred co-catalyst is triethyl aluminum having an aluminum hydride content of no more than 1.0 wt. %.

DETAILED DESCRIPTION OF THE INVENTION

Figure 1:
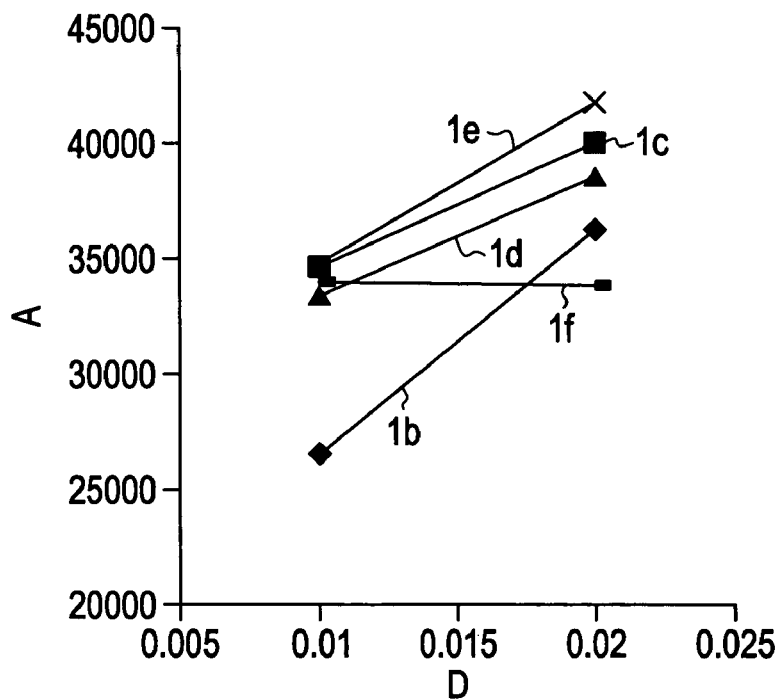
FIG. 1 is a graph of catalyst activity vs. external electron donor concentration.

In the polymerization of propylene over Ziegler-type catalysts, an important consideration is the achievement of a high yield of polymer, commonly expressed in terms of catalyst activity. Catalyst activity is normally stated in terms of grams of polymer per gram of transition metal per hour. Another important characteristic in polymer production is the bulk density of the polymer. The bulk density, commonly expressed in terms of grams per cubic centimeter, should be relatively high. If the bulk density is too low, the polymer will tend to be "fluffy" and will tend to cause plugging and handling problems in the product transfer system. This is particularly important in a continuous or a semi-continuous polymerization where plugging of the withdrawal outlet or another point in the polymerization system can cause serious interruptions in production schedules.

Yet another significant polymer characteristic is the crystallinity of the polymer product. As indicated previously, in the polymerization of propylene, the resulting polymer product can be isotactic, syndiotactic or atactic. Syndiotactic and isotactic polymers are crystalline and are relatively insoluble in hydrocarbons solvents such as xylene. Atactic polymers, on the other hand, are amorphous, waxy-type materials, which exhibit high solubility in xylene. Thus, the stereoregularity of a syndiotactic or isotactic polymer can be measured indirectly by the xylene soluble content of the polymer fluff. Depending upon the use to which the polymer fluff is to be put, the xylene soluble content normally should not exceed 4%, usually it will be preferred to provide a xylene soluble content of about 2.8–3.5 wt. %.

Another polymer characteristic is the melt flow rate determined by standard tests involving the amount of polymer extruded through a die under an applied force. One suitable characterization of polymer melt flow is the melt flow index as determined in accordance with ASTM D1238 where polymer flow at a temperature of 230° C. under an applied force of 2.1 kilograms is reported in grams per 10 minutes. For some products it is sometimes desirable to provide a polymer fluff having a high melt flow about 200 grms/10 minutes or more and preferably about 300 grams/10 minutes or more. Such polymers are useful in the formation of polypropylene fibers. These products, often characterized as ultra high melt flow polymers, involve a balance between achieving the desired high melt flow while retaining the xylene solubles at the desired level. Stated otherwise, high melt flows often are achieved at the expense of an undesirably high xylenes soluble content.

The stereoregularity of a propylene polymer can be described by regular repeatable structures which can be characterized in terms of the Fischer projection formula as described below. In the isotactic structure, all of the methyl groups attached to the tertiary carbon atom of the successive monomer units lie on the same side of a hypothetical plane extending through the main chain of the polymer as indicated schematically by the following two-dimensional representation:

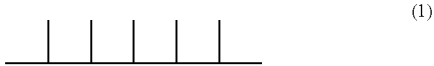

(1)

For syndiotactic structures, the methyl groups attached to the tertiary carbon atoms on successive monomer units lie on alternative sides of the hypothetical plain is as follows:

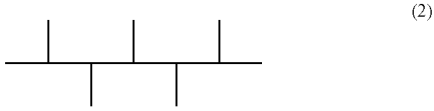

(2)

For structure (1) above, the isotactic arrangement may be described employing Bovey's NMR nomenclature as—mmmm—in which each m represents a "meso" dyad of two successive methyl groups on the same side of the plane. Using this same nomenclature, the syndiotactic structure (2) above, may be described as—rrrr—, with each r indicating a "racemic" dyad of two successive methyl groups on opposite sides of the hypothetical plane. The non-crystalline atactic polymers involve randomly irregular structures. For a further description of other characterizations of atactic, isotactic and syndiotactic polymers, reference may be had to the aforementioned U.S. Pat. Nos. 4,794,096 and 4,892,851, the entire disclosures of which are incorporated herein by reference.

As noted above, the crystallinity of a polymer such as isotactic polypropylene can be characterized in terms of the percentage of the polymer which is soluble in xylene. For highly crystalline isotactic polypropylene, with few atactic imperfections, the percent of the polymer soluble in xylene will be quite low, typically on the order of 4% or less and sometimes, below 3%. As the polymer chain becomes more atactic, xylene solubles can range to figures well in excess of 5%, which indicates polymers, while still retaining good structural integrity, having a high degree of atactic imperfections.

The present invention may be carried out employing individual catalyst components which are, in terms of the chemistry involved, well known to those skilled in the art. The present invention makes use of a supported titanium based catalyst incorporating an internal electron donor as described in the aforementioned Mayr et al. U.S. Pat. No. 4,636,486 in which the transition metal is titanium as described the aforementioned, U.S. Pat. No. 4,927,797 to Ewen.

The co-catalyst employed in the present invention is a trialkyl aluminum. Specifically, suitable trialkyl aluminums are trimethyl aluminum and triethyl aluminum as noted above, with triethyl aluminum usually being preferred. The triethyl aluminum can have incorporated therein a small amount of aluminum hydride ($AlH_3$) which can be varied to accomplish certain polymer characteristics.

For a general discussion of transition metal and co-catalyst components in Ziegler catalysis, reference is made to Boor, John "Ziegler-Natta Catalysts in Polymerizations," Academic Press, Inc., New York (1979) and particularly, Chapter 4 entitled "Chemical Description of Ziegler-Natta Catalysts for Olefins."

The external electron donor used in the present invention can be selected from a wide variety of such Lewis bases as are well known in the art. Preferably, the electron donor used here will take the form of organic silicon-containing compounds such as organic siloxanes or silanes, including silyl ethers and esters such as alkyl or arylalkyl alkoxysilanes. Particularly suitable examples include methylcyclohexyldimethoxysilane, isobutyl trimethoxysilane and diphenyl dimethoxysilane. Other suitable catalyst components which can be used in carrying out the invention are disclosed in the aforementioned U.S. Pat. No. 4,287,328 to Kikuta et al., U.S. Pat. No. 4,567,155 to Tovrog et al., U.S. Pat. No. 4,316,966 to Mineshima et al., and U.S. Pat. No. 4,927,797 to Ewen, the entire disclosures of which are incorporated herein by reference.

Various procedures can be employed in mixing the titanium co-catalyst component, the organoaluminum co-catalyst component, and the external electron donor component. These components can be mixed together, or as usually will be preferred, they can be mixed with one another sequentially under various orders of addition and contact times as described in the aforementioned U.S. Pat. No. 5,432,139 to Shamshoum et al. Thus, the present invention can involve the formulation of Ziegler-type catalysts by mixing the various components thereof under certain specific orders of additions and contact times between components when going from one contacting step to another. After the several components are mixed together, the resulting multi-component catalyst is then contacted with propylene to effect polymerization of the monomer in the presence of the Ziegler-type catalyst. Preferably, the initial propylene contacting step subsequent to formulation of the composite catalyst is a prepolymerization step with the resulting prepolymerized catalyst then being supplied to a polymerization reactor to produce the desired polymer product.

The polymerization process may be carried out as either a batch-type, continuous, or semi-continuous process, but preferably, polymerization of the propylene monomer will be carried out in a loop-type reactor of the type disclosed in the aforementioned U.S. Pat. No. 4,767,735 to Ewen et al. As described in the Ewen et al. patent, when the catalyst components are formulated together, they are supplied to a linear tubular pre-polymerization reactor where they are contacted for a relatively short time with the pre-polymerization propylene prior to being introduced into the main loop-type reactor. By way of example, the residence time of the catalyst and monomer within the pre-polymerization reactor will be normally less than a minute, and usually within the range of a few seconds to perhaps 20 seconds. In the experimental work using a batch-type process described hereinafter, the catalyst components, after being combined to form the Ziegler-type catalysts, were pre-polymerized with propylene for a period of 2–5 minutes.

Subject to the requirements of titanium content and the relative amounts of co-catalyst and electron donors as described in greater detail below, the catalyst systems of the present invention may be any suitable type. Catalyst systems preferred for use in carrying out the invention are the so-called new generation titanium catalyst as described in the called new generation catalysts may comprise a solid catalyst component obtained by (i) suspending a dialkoxy magnesium in an aromatic hydrocarbon that is liquid at normal temperatures, (ii) contacting the dialkoxy magnesium with a titanium halide and further (iii) contacting the resulting composition a second time with the titanium halide, and contacting the dialkoxy magnesium with an internal electron donor, specifically a diester of an aromatic dicarboxylic acid at some point during the treatment with the titanium halide in (ii).

Suitable aromatic hydrocarbons useful in the formation of the catalyst include benzene, xylene, ethylbenzene, propylbenzene and trimethylbenzene. A diester of phthalic acid is normally used as the diester of the aromatic dicarboxylic acid. Examples of suitable internal electron donors include dimethyl phthalate, diethyl phthalate, dipropyl phthalate, diisopropyl phthalate, dibutyl phthalate, diisobutyl phthalate, diamyl phthalate, diisoamyl phthalate, methylbutyl phthalate, ethylbutyl phthalate, ethylisobutyl phthalate and ethylpropyl phthalate. Suitable titanium halides include $TiCl_4$, $TiBr_4$ and $TiI_4$, with $TiCl_4$ being preferred.

The ratios of the respective components can be varied to arrive at the desired titanium content of the catalyst. In general, the diester of the aromatic dicarboxylic acid is used in an amount of 0.01 to 2 g, usually 0.1 to 1 g, per gram of the dialkoxy magnesium, and the titanium halide is used in an amount of at least 0.1 g, preferably at least 1 g, per gram of the alkoxy magnesium. The amount of the aromatic hydrocarbon which is liquid at normal temperature should be sufficient to form a suspension.

Suspension of the dialkoxy magnesium into the aromatic hydrocarbon may be performed at a temperature of from room temperature to the boiling point of the aromatic hydrocarbon used for up to 100 hours, preferably up to 10 hours. The formed suspension should not be a homogeneous solution. The contact of the suspension with the titanium halide and the contact of the composition obtained by said contact with the titanium halide may be carried out at a temperature of from −20° C. to the boiling point of the titanium halide used, usually 50° to 120° C., for 10 minutes to 10 hours. The means for contacting the components is not particularly critical, so long as sufficient contact is attained among the respective components. The contact is carried out by using a vessel provided with a stirrer.

The external electron donors used in carrying out the present invention are organic silicon compounds such as those described by the following formula:

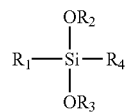

wherein $R_1$ is a bulky, basic alkyl or cycloalkyl group containing at least one secondary or tertiary carbon atom; $R_2$ and $R_3$ are alkyl or aryl groups; and $R_4$ is an alkyl group with a primary carbon atom attached to the silicon atom. In preferred external electron donors, $R_1$ is a cyclohexyl or t-butyl group, $R_2$ and $R_3$ are methyl, ethyl or propyl groups, and $R_4$ is a group containing 1–6 carbon atoms. A most preferred electron donor is methylcyclohexyldimethoxysilane ("MCMS").

In the production of high melt flow polypropylene in accordance with the present invention, molecular hydrogen, $H_2$, is supplied to the polymerization reactor in a limited amount. Normally, it will be preferred to limit the hydrogen to one mol percent of the propylene introduced into a loop-type reactor as described below. Preferably, hydrogen within the range of about 0.45 to 0.9 mol. % is employed. Where higher pressure reactors are used, greater amounts of hydrogen up to about 2.0 mol. % can be employed. As indicated by the experimental work described below, the hydrogen content can be maintained below one mol percent while still producing a polymer of high melt flow characteristics when employing the preferred titanium-based catalyst in the present invention.

In addition to the amount of hydrogen employed in the polymerization procedure, the amount of external electron donor employed can also have an impact on melt flow of the polymer product. The amount of external donor can also be varied depending upon the internal donor level of the titanium catalyst component. Thus, if the internal donor is at a relatively high level, a lower amount of external donor can be employed to achieve a desired melt flow rate. As indicated previously, achieving a desired high melt flow rate must be balanced against the xylenes soluble content of the polymer. The desired polymer characteristic produced in accordance with the present invention is a xylene-soluble content of 4 wt. % or less, preferably within the range of about 2.5 or 3.5 wt. % with a melt flow rate of 200 grams/10 minutes, preferably a melt flow rate within the range of 300–350 grams/10 minutes.

Suitable catalyst systems, including internal and external electron donors of the type described above are disclosed in U.S. Pat. No. 6,323,293 to Shamshoum et al., the entire disclosure which is incorporated herein by reference. However, whereas the Shamshoum et al. patent discloses very broad titanium contents ranging from about 1.5 wt. % to about 6 wt. % titanium, the catalyst employed in the present invention has a titanium content of at least 1.7 and preferably at least 1.8, ranging up to 2.2 wt. %. By employing the catalyst having a limited titanium content in accordance with the present invention and providing for a good hydrogen response, the polymerization reaction can be carried out to provide a polymer fluff having a melt flow rate of at least 200 grams/10 minutes as described previously. This may be contrasted with the much lower melt flow rates of 30 grams/10 minutes or less as disclosed in the aforementioned Shamshoum et al. patent.

In laboratory experimental runs carried respecting the present invention, a number of titanium catalysts identified herein as Catalysts A through F were employed under different conditions of co-catalyst content, external donor content, and hydrogen content. The laboratory polymerization procedures were carried out in a batch-type reactor at a polymerization temperature of about 70° C. and a pressure of about 650–750 psig. The various catalysts employed an internal donor, di-isobutylphthalate, varying from about 8 to 11 wt. %. The cocatalyst employed in the experimental work was tri-ethylaluminum (TEAL) containing less than 1 wt. % aluminum hydride, and the external electron donor was cyclohexylmethyldimethoxysilane (CMDS). The catalysts employed in this suite of experiments were relatively low titanium content catalysts, i.e. catalysts having less than about 2.0 wt. % titanium. The characteristics of the catalysts identified herein as Catalysts A through F are set forth in Table 1.

TABLE 1

| Catalyst | % Ti Content | Cat. Particle Size, d50 [µ] |
|---|---|---|
| A | 1.50 | 10.9 |
| B | 1.85 | 12.6 |
| C | 1.73 | 11.6 |
| D | 1.63 | 11.3 |
| E | 1.86 | 9.6 |
| F | 1.6 | 9.2 |

Figure 2:
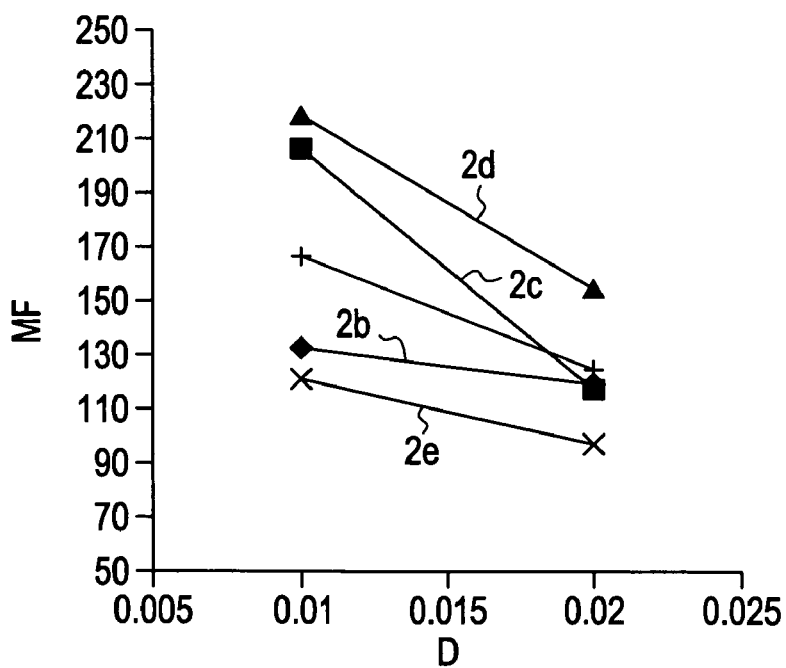
FIG. 2 is a graph of melt flow of polymer product produced by various catalysts vs. external electron donor concentration.
Figure 3:
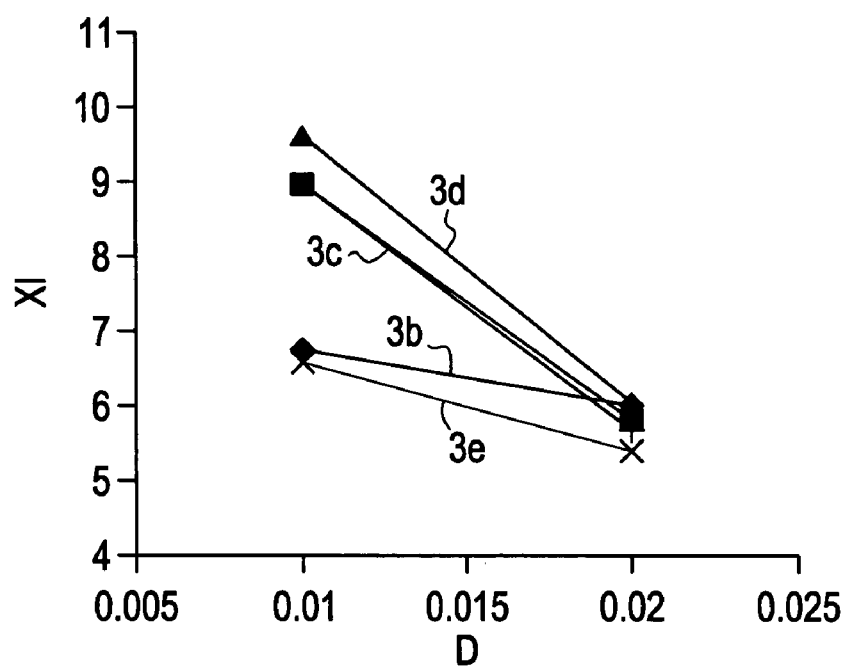
FIG. 3 is a graph of xylene solubles content of products produced by various catalyst components as a function of external electron donor concentration.

In a first suite of experiments, the catalysts identified above as Catalysts A through F were employed in laboratory polymerization experiments using a TEAL cocatalyst having a low hydride content of less than 0.1 wt. % as aluminum hydride (AlH$_3$). The results of this experimental work in terms of activity, melt flow of the polymer product, and percent xylenes content of the polymer product, all as a function of the amount of electron donor, CMDS, are reported in FIGS. 1 through 3. More specifically, FIG. 1 is a plot of activity A in grams of polymer per gram of titanium per hour plotted on the ordinate versus the external donor concentration in millimoles, D, plotted on the abscissa. FIG. 2 is a plot of melt flow, MF, in grams/10 minutes plotted on the ordinate versus the external electron donor level, D, in millimoles on the abscissa, and FIG. 3 represents a plot of xylene soluble content, xl, in wt. % of the polymer fluff, plotted on the ordinate versus the external donor level, D, in millimoles plotted on the abscissa. In each of FIGS. 1–3 the curve representing the variable reported is designated by the letter suffix corresponding to the catalyst identifications presented in Table 1. Thus, in FIG. 1, curve 1b is a plot of activity of the catalyst reported for Catalyst B of FIG. 1 plotted as a function of the donor level ranging from 0.01 through 0.02 millimoles. Similarly, curve 1f is a plot of the catalyst activity for Catalyst F as a plot of donor levels. Similar results are reported in FIGS. 2 and 3. Thus, in FIG. 2, for example, the melt flow of the polymer fluff produced by Catalyst B is indicated by curve 2b for external donor levels ranging from 0.01 to 0.02 millimoles. Similar designations are used in FIG. 3 to indicate the xylenes soluble content of the polymer fluff product by the various catalyst designated as B through F in Table 1 as a function of the external electron donor content. In evaluating the various catalyst characteristics reported in this experimental work, it is to be realized that the results reported for the various catalysts and titanium contents of the catalysts are qualitative with respect to each other and can be correlated qualitatively to actual plant operations. Thus, considering melt flow, for example, in an actual operation carried out in a loop-type reactor at pressures and temperatures typically involved in the operation of such reactors, e.g. 60–80° C. and 35–45 atmospheres, higher melt flow levels result than indicated quantitatively by the experimental work. However, the qualitative response of melt flow to donor levels shown in the experimental work can be expected to be found in actual plant operations. Thus, considering Catalyst E, for example, which shows only a modest decrease in melt flow with an increase in external donor level, this same relatively flat response can be expected to occur in actual plant operations.

Bearing in mind the competing relationships between electron donor content and melt flow and xylenes soluble, i.e., a relatively high electron donor content corresponding to a desired low xylene soluble content, but also a lower melt flow content, it can been seen that Catalyst B and E, having the somewhat higher titanium contents of about 1.85 versus the remaining catalysts, having relatively flat responses in both melt flow and xylene solubles as the external electron donor is increased from a low value to a high value. This enables the practice of the present invention to achieve relatively high melt flows without an unacceptable sacrifice in xylenes soluble content by control of hydrogen level in the polymerization reactor. Specifically, the hydrogen content can be increased to enhance the melt flow index of the resulting polymer product while retaining a relatively flat response in xylene solubles.

Figure 4:
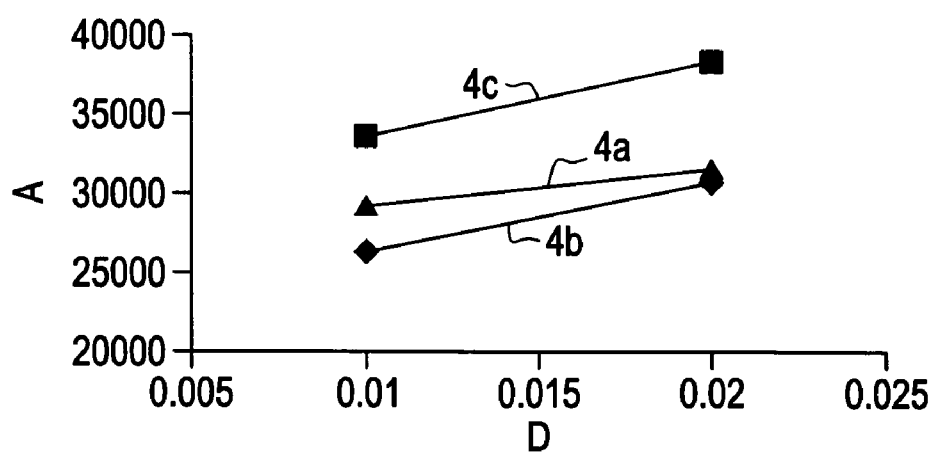
FIG. 4 is a graph of catalyst activities vs. electron donor concentration for various catalyst components at the same hydrogen concentration.
Figure 5:
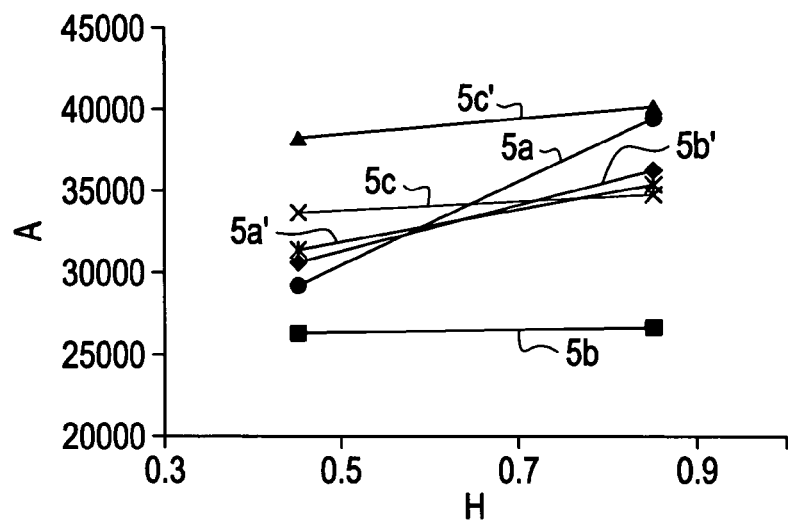
FIG. 5 is a graph of catalyst activity for various catalyst components as a function of hydrogen concentration.
Figure 6:
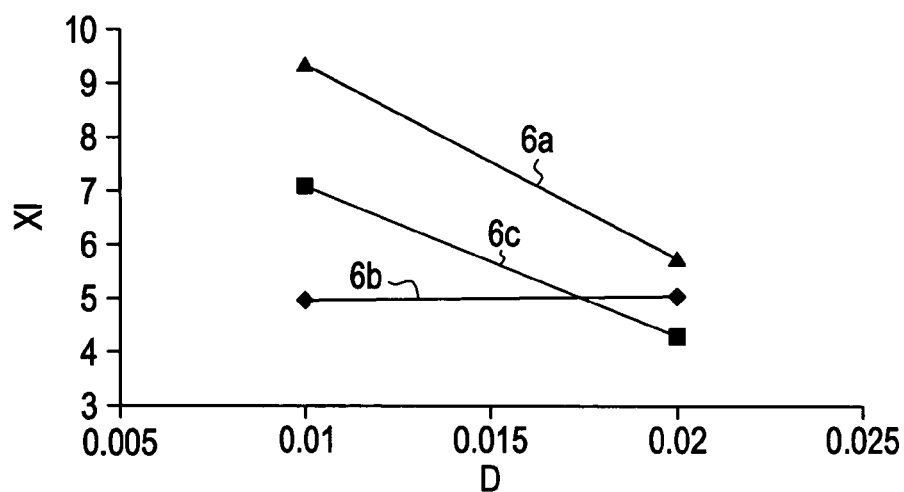
FIG. 6 is a graph of xylene solubles content polymer fluff produced by various catalyst components as a function of external electron donor concentration.
Figure 7:
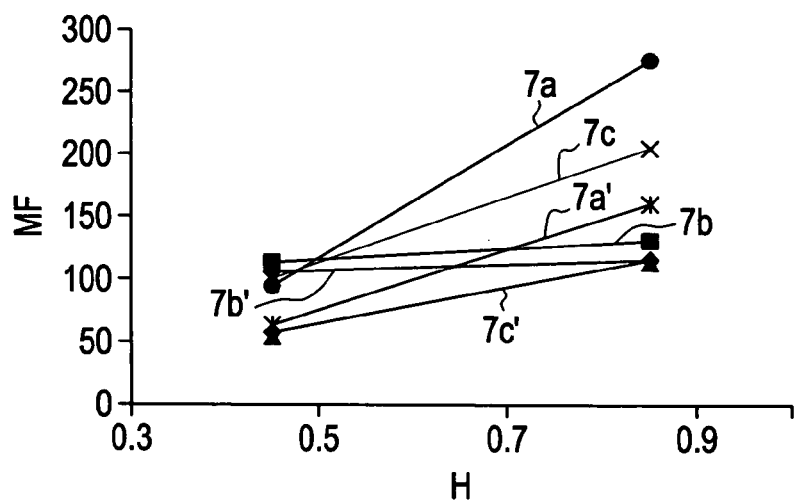
FIG. 7 is a graph of the melt flow of polymer products produced by various catalyst components as a function of hydrogen concentration.

The response to hydrogen of certain of the catalysts set forth in Table 1, along with the corresponding external donor response, is illustrated in FIGS. 4 through 7. More specifically, FIGS. 4 and 5 illustrate the activities, A, of the catalyst plotted on the ordinate versus the donor level, D, plotted on the abscissa in FIG. 4 and the hydrogen level, H, in mol percent plotted on the abscissa in FIG. 5. FIG. 6 illustrates the xylene soluble content, xl, in wt. % as a function of donor level, D, in mmol on the abscissa, and FIG. 7 illustrates the melt flow, MF, in grams/10 minutes, as a function of hydrogen, H, in mol percent on the abscissa. As in the case of FIGS. 1–3, the various curves of the corresponding catalysts are indicated by the catalyst designations of Table 1. Thus, in FIG. 4 curve 4a indicates the activity achieved with Catalyst A at the donor levels of 0.01 and 0.02 millimoles. Similar designations are employed in FIG. 6 with curve 6a indicating the xylene solubles content resulting as a function of donor level for polymer fluff produced by Catalyst A of Table 1. In FIGS. 5 and 7, the respective catalyst activities and melt flow indices are indicated by the catalyst designation for the lower donor content, corresponding to an aluminum/silicon ratio of 100 and the same designation primed is used to indicate the higher donor content corresponding to an aluminum/silicon mol ratio of 50. Thus, in FIG. 5, for example, curve 5c indicates the activity as a function of hydrogen level with an external donor content of 0.01 millimoles corresponding to a silicon/aluminum atomic ratio of 100. Curve 5c' illustrates the activity for Catalyst C at the higher external donor corresponding to a lower aluminum/silicon mol ratio of 50. Similar designations are used in FIG. 7 for aluminum/silicon mol ratios of 100, e.g., 7c for the melt flow resulting from Catalyst C with an aluminum/silicon mol ratio of 100 and 7c' for Catalyst C at the lower aluminum/silicon mol ratio of 50 (corresponding to a donor level of 0.02 mmols of CMDS).

As can be seen from the foregoing experimental work, the titanium-based Ziegler-Natta catalyst can be employed in carrying out the present invention to provide polymer fluff characterized by a high melt flow rate while retaining a low xylene soluble content, indicative of a highly stereoregular polymer. The melt flow rates can be increased by increasing hydrogen concentrations. The relationship between the xylene content and the external electron donor, such as cyclohexylmethyledimethoxysilane, also provides a system for regulation of the characteristics of the polymer fluff.

Having described specific embodiments of the present invention, it will be understood that modifications thereof may be suggested to those skilled in the art, and it is intended to cover all such modifications as fall within the scope of the appended claims.

What is claimed:

1. A method to produce a stereo regular propylene polymer, the method comprising:
   operating a polymerization reactor under temperature and pressure conditions effective for the reaction of propylene supplied to said reactor to produce a stereo regular propylene polymer fluff;
   supplying a monomer stream containing propylene to said reactor;
   incorporating into said monomer stream a titanium-based supported Ziegler-Natta Catalyst having an internal electron donor and a titanium content in amount of from 1.7 wt. % to 2.2 wt. %;
   supplying to said propylene monomer stream a co-catalyst comprising a trialkylaluminum wherein the co-catalyst is present in an amount to provide an aluminum/titanium molar ratio within the range of 50–500;
   supplying to said propylene monomer stream a silicone-based external electron donor in an amount to provide an aluminum/silicon molar ratio within the range of 10–500; and
   recovering polymer fluff from said polymerization reactor having a melt flow rate of at least 200 grams/10 minutes and a xylene soluble content of no more than 4 wt. %.

2. The method of claim 1 wherein said Ziegler-Natta catalyst has a titanium content in amount of from 1.8 wt to 2.2 wt.

3. The method of claim 1, wherein said polymer fluff has a melt flow rate in excess of at least 300 grams/10 minutes and a xylene soluble content of no more than 3.5 wt. %.

4. The method of claim 1 wherein said supported Ziegler-Natta catalyst comprises titanium tetrachloride on a magnesium-based support.

5. The method of claim 4 wherein said internal electron donor is di-butylphthalate.

6. The method of claim 5 wherein said external electron donor is cyclohexylmethyldimethoxysilane.

7. The method of claim 1, wherein said trialkyl aluminum co-catalyst is triethyl aluminum.

8. The method of claim 7 wherein said tryethyl aluminum contains aluminum hydride in an amount of no more than 1 wt. %.

9. The method of claim 1 further comprising supplying hydrogen to said reactor in an amount of no more than 1 mole percent of the propylene supplied to said reactor.

10. The method of claim 9 wherein said hydrogen is supplied to said reactor in an amount within the range of 0.45–0.9 mole percent of the propylene supplied to said reactor.

11. A method for polymerization of propylene with a Ziegler catalyst to provide a high melt flow index propylene polymer, the method comprising:
    providing a supported catalyst component comprising a titanium tetrahalide supported on a magnesium based support and an internal electron donor comprising a diester of an aromatic dicarboxylic acid, said catalyst component containing titanium in an amount of from 1.7 wt to 2.2 wt;
    providing a trialkyl aluminum co-catalyst component selected from the group consisting of trimethylaluminum and triethylaluminum;
    providing an organosilyl external electron donor component;
    combining said supported catalyst component, said organoaluminum co-catalyst component and said external electron donor component in relative amounts to provide an aluminum/silicon mol ratio within the range of 10–500 an aluminum/titanium molar ratio within the range of 50–500 and a silicon/titanium mol ratio within the range of 1–50;
    introducing said combined catalyst system into a polymerization reactor and into a contact with propylene;
    supplying hydrogen into said polymerization reactor; and
    within said polymerization reactor effecting polymerization of said propylene in the presence of said catalyst system to produce a polymer fluff having a melt flow rate of at least 300 grams/10 minutes and a xylene soluble content of no more than 4 wt %.

12. The method of claim 11 wherein said Ziegler-Natta catalyst has a titanium content of from 1.8 wt to 2.2 wt.

13. The method of claim 11 further comprising supplying hydrogen to said reactor in an amount of no more than 1 mole percent of the propylene supplied to said reactor.

14. The method of claim 11 wherein said hydrogen is supplied to said reactor in an amount within the range of 0.45–0.9 mole percent of the propylene supplied to said reactor.

15. The method of claim 13 wherein said internal electron donor is di-butylphthalate.

16. The method of claim 15 wherein said external electron donor is cyclohexylmethyldimethoxysilane.

17. The method of claim 16 wherein said trialkyl aluminum contains aluminum hydride in an amount of no more than 1 wt. %.

18. The method of claim 16 wherein said polymer fluff has a xylene soluble content of 2.8–3.5 wt. %.

19. A method to produce a stereo regular propylene polymer, the method comprising:
    operating a polymerization reactor under temperature and pressure conditions effective for the reaction of propylene supplied to said reactor to produce a stereo regular propylene polymer fluff;
    supplying a monomer stream containing propylene to said reactor;
    incorporating into said monomer stream a titanium-based supported Ziegler-Natta Catalyst having an internal electron donor consisting essentially of a phthalate compound and a titanium content in amount of at least 1.7 wt. %;
    supplying to said propylene monomer stream a co-catalyst comprising a trialkylaluminum wherein the co-catalyst is present in an amount to provide an aluminum/titanium molar ratio within the range of 50–500;
    supplying to said propylene monomer stream a silicone-based external electron donor in an amount to provide an aluminum/silicon molar ratio within the range of 10–500; and
    recovering polymer fluff from said polymerization reactor having a melt flow rate of at least 200 grams/10 minutes and a xylene soluble content of no more than 4 wt. %.

* * * * *